Figure 1:
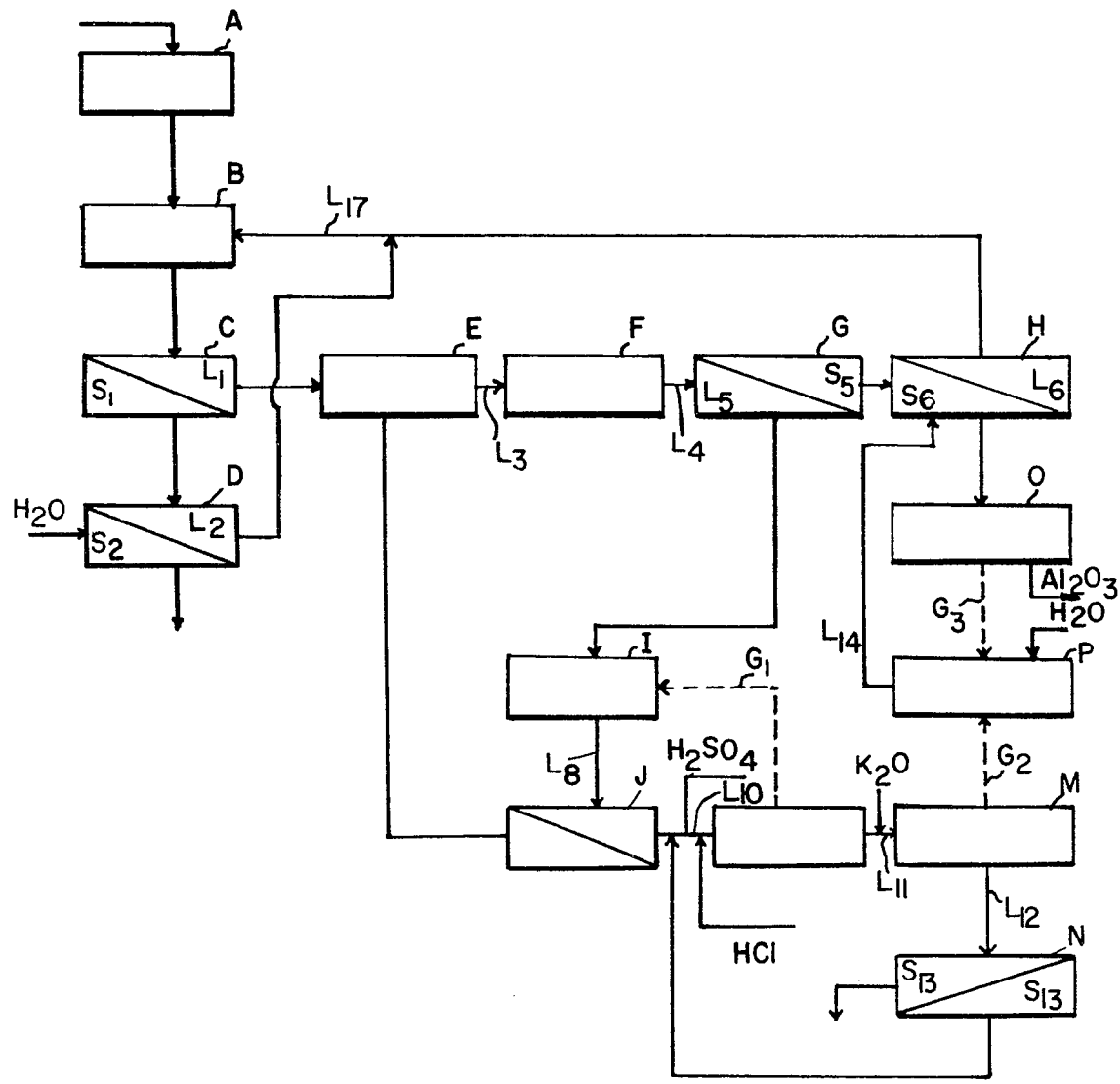

United States Patent [19]

Cohen et al.

[11] 4,237,102
[45] Dec. 2, 1980

[54] PROCESS FOR OBTAINING PURE ALUMINA BY THE HYDROCHLORIC ATTACK OF ALUMINOUS ORES AND EXTRACTION OF THE IMPURITIES BY MEANS OF A SULPHURIC TREATMENT

[75] Inventors: Joseph Cohen; Alain Adjemian, both of Aix-en-Provence, France

[73] Assignee: Aluminum Pechiney, Lyon, France

[21] Appl. No.: 35,440

[22] Filed: May 8, 1979

[30] Foreign Application Priority Data

May 18, 1978 [FR] France .................................. 78 15369

[51] Int. Cl.$^3$ ............................. C01F 7/22; C01F 7/26
[52] U.S. Cl. ..................................... 423/126; 423/128; 423/132
[58] Field of Search ................. 423/111, 126, 128, 132

[56] References Cited

U.S. PATENT DOCUMENTS

| | | | |
|---|---|---|---|
| 3,484,196 | 12/1969 | Cohen et al. | 423/128 |
| 3,620,671 | 11/1971 | Maurel et al. | 423/128 |
| 3,862,293 | 1/1975 | Maurel et al. | 423/128 |
| 4,124,680 | 11/1978 | Cohen et al. | 423/132 |

FOREIGN PATENT DOCUMENTS

| | | | |
|---|---|---|---|
| 574983 | 7/1924 | France | 423/132 |
| 1554586 | 1/1969 | France | 423/126 |
| 4424883 | 10/1969 | Japan | 423/132 |

*Primary Examiner*—Herbert T. Carter
*Attorney, Agent, or Firm*—McDougall, Hersh & Scott

[57] ABSTRACT

A cyclic process for obtaining very pure alumina by the hydrochloric acid attack of a silico-aluminous material, the said process comprising, in a first stage, the precipitation of at most 75% of the alumina present in the liquor originating from the attack in the form of hexahydrated aluminum chloride which is subsequently decomposed by heating, then, in a second stage, the treatment of the liquor leaving the first stage with HCl gas in order to precipitate dissolved $Al_2O_3$ in the form of hexahydrated aluminum chloride which is recycled into the liquor leaving the attack, while the hydrochloric liquor leaving the second stage and impoverished in $Al_2O_3$ but rich in impurities, is treated with a recycled sulphuric liquor in order to precipitate impurities as their corresponding sulphates.

5 Claims, 1 Drawing Figure

PROCESS FOR OBTAINING PURE ALUMINA BY THE HYDROCHLORIC ATTACK OF ALUMINOUS ORES AND EXTRACTION OF THE IMPURITIES BY MEANS OF A SULPHURIC TREATMENT

The invention relates to a new process for obtaining pure alumina comprising the hydrochloric attack of aluminous ores containing impurities followed by a treatment for concentrating the liquor resulting from the attack, precipitation of the majority of hexahydrated aluminum chloride and its separation from a first hydrochloric mother liquor, pyrohydrolysis of the precipitate giving the desired pure alumina, recycling of the hydrochloric acid to the attack, precipitation of the remaining fraction of aluminum chloride in the first mother liquor by introduction of gaseous HCl and its separation from a second hydrochloric mother liquor, finally the elimination of the impurities present in the latter liquor by sulphuric precipitation.

The hydrochloric acid attack of aluminous ores for extraction of alumina has been proposed for a long time. Although these processes have the common feature of the hydrochloric acid attack, they differ materially in the means used to eliminate the impurities originating from the ore. Thus, British Patent No. 982,098 has proposed the attack of a calcined clay ore by means of a 20% hydrochloric solution, then, after separation of the sterile fraction constituted of silica, the extraction of impurities constituted essentially by iron, present in the separated liquor, by ion exchange either over a solid resin or over an organic solvent. The hexahydrated aluminum chloride was then precipitated by evaporating the purified liquor. Although this process is of interest, it nevertheless has the disadvantage of necessitating regeneration of the resin or of the solvent. Such regeneration demands very large volumes of liquors which then has to be treated before being rejected, thus consuming a large amount of energy.

Another more recent publication, British Patent No. 1,104,088, also describes the hydrochloric attack of aluminous ores, and the crystallization of hexahydrated aluminum chloride by performing this crystallization in several stages, the first stage giving, for example, pure hexahydrated aluminum chloride while the other stages delivered the impure hydrated aluminum chloride. The impurities, found in solution in the liquor after the original attack, are eliminated from a sample of a mother liquor originating from the last stage of crystallization of the hexahydrated aluminum chloride by evaporation and crystallization.

Although a process of this type may be of great interest to the person skilled in the art, practical disadvantages have appeared, two of which are really significant:
(a) The sampling of the mother liquor originating from the last crystallization stage of the aluminum chloride represented a large volume and, owing to this very fact, a significant quantity of energy was required to induce crystallization of the impurities by evaporation of the water,
(b) In addition to this fact, this liquor, derived after the last crystallization stage, was rich in aluminum with a yield higher than 13%, leading to unacceptable losses of this material.

Finally, a much more recent process has been described in French Pat. No. 1,541,467. After hydrochloric attack of the aluminous ore, followed by crystallization of the hexahydrated aluminum chloride in at least two stages by evaporation of water, the calcium present in solution in the mother liquor, obtained after the first stage of crystallization of the hexahydrated aluminum chloride, was precipitated in the form of calcium sulphate and separated from the said liquor by the addition of a stoichiometric quantity of sulphuric acid, while the iron was extracted by means of a selective organic solvent or of a sequestering agent. This process also had disadvantages such as loss of solvent with the aqueous liquors as well as the need to purge the impurities which had not been eliminated by the solvent, involving loss of hydrated aluminum chloride.

Although these cyclic processes have numerous advantages, it must be admitted that their application could not be sufficiently widespread in the present economic situation owing to their high energy consumption and the release of effluent into the natural channels which is being increasingly forbidden.

In pursuing their research in this field, the applicants have attempted to develop a process for the hydrochloric attack of aluminous ores, combined with efficient purification of the mother liquor obtained after the precipitation and separation of the majority of the hexahydrated aluminum chloride, all the liquor collected in this way being purified.

The process according to the invention, which permits a very pure alumina to be obtained from a calcined or uncalcined aluminous ore containing impurities, involving a hot hydrochloric acid attack of the ore, separation of the residue of the attack and the attacking liquor, washing of the residue of the attack, concentration of the attacking liquor causing $AlCl_3, 6H_2O$ to precipitate, calcination of this chloride and the recycling of the effluents, is characterized in that, in a first stage, the liquor emanating from the attack is concentrated until at most 75% of $Al_2O_3$ present in the liquor is obtained in the form of hexahydrated aluminum chloride, in that, in a second stage, the alumina fraction, which is still dissolved in the liquor containing impurities and obtained by separating the $AlCl_3, 6H_2O$ crystals from the first stage, is precipitated by introducing gaseous HCl, separated from the hydrochloric liquor which is poor in alumina but contains impurities, and recycled into the liquor emanating from the attack, while the hydrochloric liquor which is poor in alumina and rich in impurities is mixed with a recycled sulphuric liquor, the mixture being degassed by heating so as to recover HCl gas which is used in the second stage, in that some potassium, which is optionally recycled, is introduced into the sulphuric liquor of impurities in order to precipitate, by concentration from the said liquor, ferripotassium sulphate and the other sulphates of impurities corresponding to the quantity of impurities originating from the ores, and recycling the sulphuric mother liquor, which is freed from impurities, to the hydrochloride mother liquor from the second stage.

In its essential features, the process according to the invention comprises the following phases:
(a) the attack of an aluminous ore, calcined or uncalcined, depending on its nature and which also contains other constituents such as iron, calcium, etc., by a recycled aqueous hydrochloric solution containing, by weight, about 20% of free HCl and between 1% and 3% of aluminum chlorides and various metals forming the impurities which are still present in the said liquor, and which permits a solution to be obtained after attack which is rich in dissolved aluminum chloride and can attain a concentration of 8 to 9% by weight of $Al_2O_3$;

(b) the separation of an impregnated residue resulting from the attack and of a hydrochloric liquor;

(c) the treatment of the residue (b) in order to extract the impregnating liquor, using an adequate quantity of washing water to obtain inert gangue materials which are eliminated and an aqueous solution which is recycled to the attack;

(d) the concentration of the hydrochloric liquor containing alumina and soluble impurities until at most 75% of the alumina present is precipitated in the form of hydrated aluminum chloride, corresponding to the formula $AlCl_3, 6H_2O$;

(e) the separation of this first crystallized fraction into hydrated aluminum chloride impregnated with mother liquors and a first hydrochloric mother liquor containing in solution the remainder of the alumina and almost all the impurities;

(f) the washing of these crystals of hydrated aluminum chlorides with a hydrochloric acid liquor;

(g) the recycling of the hydrochloric liquor emanating from the washing of the hydrated aluminum chloride to (a) the attack on the ore;

(h) the thermal decomposition of the hydrated aluminum chloride, to yield pure alumina, and the absorption of the hydrochloric gaseous effluents to constitute the above-mentioned washing liquor (f);

(i) the chlorination of the first hydrochloric mother liquor, which is rich in impurities, by means of gaseous HCl, with the aim of recovering contained alumina;

(j) the separation of the second crystallized fraction of hydrated aluminum chloride and the second hydrochloric mother liquor, which is rich in dissolved impurities, and the recycling of the said solid fraction into the liquor after attack, but before the concentration step (d);

(k) the introduction of a recycled sulphuric liquor into the second hydrochloric mother liquor which is rich in impurities;

(l) the degassing of the sulphohydrochloric mother liquor obtained in (k) with recycling of the gaseous HCl to the above-mentioned chlorination treatment (i);

(m) the introduction of potassium in a suitable form, such as the sulphate, chloride or alum, optionally recycled;

(n) the concentration of the sulphuric mother liquor with the separation of the last traces of HCl until sulphates of the impurities are precipitated in quantities corresponding to the quantities of impurities emanating from the attack of the ore and from the potassium sulphate introduced;

(o) finally, the separation of the crystals of sulphates of impurities and the sulphuric liquor which is recycled into the hydrochloric mother liquor which is rich in impurities before the said liquor is degassed.

The solution for attacking aluminous ores is constituted by recycled aqueous solutions containing hydrochloric acid, the content of which can be adjusted by an addition of fresh HCl at any point in the cycle in order to compensate for losses, as well as an addition of water which can be formed of the water used for washing the inert materials, in order to obtain a 20% attacking liquor.

The aluminous ore is attacked at an elevated temperature close to the boiling point, generally at atmospheric pressure and for a period which can vary from ½ hour to 5 hours.

After the hydrochloric attack of the ore, the product of the attack, comprising a solid phase constituted by inert materials and a liquid phase in which the aluminum chloride and the soluble impurities are dissolved, is subjected to separation.

The residue from the attack forming the solid phase is then washed with a suitable quantity of water, the resulting liquor being recycled to the attack of the ore once the inert materials have been rinsed.

The liquor resulting from the hydrochloric attack of the aluminous ore is concentrated by evaporation until at most 75% of the alumina present precipitates in the form of hexahydrated aluminum chloride, which is separated from its hydrochloric mother liquor containing the impurities.

The crystals of hydrated aluminum chloride, thus obtained, and washed with a hydrochloric liquor are very pure. They are then calcined, as by known processes, giving the desired pure alumina and some gaseous HCl which is absorbed by water and constitutes the liquor which is rich in HCl and which is intended for washing the said precipitate.

Owing to the washing of the hexahydrated aluminum chloride, the hydrochloric liquor carries along the impurities present in the precipitate, while dissolving a small fraction of alumina of the order of 2%. After washing, this liquor is recycled to the head of the process to the liquor for attacking the aluminous ore.

The first hydrochloric mother liquor, which is separated from the crystals of hexahydrated aluminum chloride, contains the majority of the impurities constituted by iron, titanium, sodium, potassium, magnesium, calcium, etc. as well as a non-negligible fraction of alumina, is then saturated with HCl by the introduction of recycled gaseous hydrochloric acid, inducing the precipitation of the residual hexahydrated aluminum chloride.

After separation, the hydrated aluminum chloride, which is charged with a relatively large amount of impurities, is recycled into the liquor resulting from the attack to be dissolved and subsequently to be concentrated by evaporation of water, with precipitation of the hexahydrated aluminum chloride intended for calcination.

Once the impurities have been eliminated from the alumina, which is still present in the first mother liquor, a second hydrochloric mother liquor charged with these impurities is mixed with a recycled sulphuric acid liquor containing between 45 and 65% of free $H_2SO_4$, thus giving a sulpho hydrochloric liquor containing impurities. The said sulpho hydrochloric liquor is then degassed by heating, permitting the collection of gaseous hydrochloric acid intended for the chlorination of the first hydrochloric mother liquor which is charged with impurities, in order to induce the precipitation of the alumina present, as previously described.

The sulphuric liquor, to which recycled potassium can be added, is then subjected to concentration by evaporation until the impurities emanating from the attack of the ore are precipitated in the form of their sulphates. The precipitated salts are essentially constituted by ferripotassium, titano-potassium sulphates, calcium, phosphorus, magnesium and sodium sulphate, and have entrained the other impurities.

After separation, the sulphuric liquor, which is freed from a quantity of impurities equal to the quantity introduced into the treatment cycle during the attack, is recycled while the solid residue can be treated in various ways in order to recover, for example, the potassium and/or other constituents, and is optionally calcined to increase the value of the $SO_2$ by transforming it into $H_2SO_4$ and reintroducing it into the circuit.

The process according to the invention is a cyclic process which yields a pure alumina and a mixture of salts of impurities which are present in the form of single and/or double sulphates.

The consumption of reagent is low and concerns only the replacement of the losses in hydrochloric and sulphuric acid.

The process according to the invention can be applied to the treatment of natural or artificial aluminous materials containing impurities. These materials include silico-aluminous ores, such as kaolins, siliceous bauxites, kaolin clays, shales containing or not containing coal, or impure aluminas originating from other processes.

The invention will hereinafter be described with reference to the accompanying flow diagram.

According to the FIGURE, the raw ore is placed in (A) where it is calcined.

The calcined ore and the recycled attacking hydrochloric liquor $L_7$ are then introduced into the attacking reactor (B). The pulp obtained after the attack is led from (B) to (C) where an attacking residue $S_1$ is separated from a hydrochloric liquor $L_1$ containing the alumina and the dissolved impurities. The mother liquors for impregnating the cake $S_1$ are then extracted in (D) by means of a sufficient quantity of water, and the resulting liquor $L_2$ is led and mixed with the liquor $L_7$ before being introduced into the attack.

The cake $S_2$ is then isolated: it is formed essentially of silica and oxides which have not been dissolved by the attack.

The liquor $L_1$, obtained after the attack of the ore and the separation of the sterile materials, is then introduced into (E) to dissolve the solid fraction $S_9$ formed by the hexahydrated aluminum chloride, which contains a relatively large amount of impurities, representing at least 25% of the alumina present in the ore subjected to the attack.

Once this fraction has dissolved, the liquor $L_3$, originating from (E), is passed into (F) where concentration is effected by evaporation until at most 75% of the alumina initially present in the ore precipitates in the form of hexahydrated aluminum chloride, corresponding to the formula $AlCl_3, 6H_2O$.

The fraction $L_4$, originating from the evaporation (F) is, in fact, a pulp constituted of a solid phase and a liquid phase which are separated at (G) into a solid fraction $S_5$ of hydrated aluminum chloride and a liquor $L_5$ containing the majority of the impurities constituted of iron, titanium, sodium, potassium, magnesium, calcium, etc., as well as the fraction of unprecipitated alumina representing at least 25% of the alumina initially present in the ore.

The crystals $S_5$ of hydrated aluminum chloride are then introduced into (H) where they are rinsed with a recycled hydrochloric liquor $L_{14}$. Pure crystals $S_6$ of $AlCl_3, 6H_2O$, which are free from the hydrochloric liquor, are obtained while the mother liquor entrained by $L_{14}$ constitutes a fresh hydrochloric liquor $L_6$ containing only a very small quantity of impurities which is subsequently added to the liquor $L_2$ originating from the washing of the inert materials to form the attacking liquor $L_7$.

The pure crystals $S_6$, which are impregnated with the rinsing liquor, are then thermally decomposed in (O), yielding a pure alumina and a gaseous mixture $G_3$ containing the hydrochloric gas and the water vapor which are absorbed in (P).

As previously described, the liquor $L_5$ emanating from the separation (G) contains, in solution, the majority of the impurities and at least 25% of the alumina initially present in the ore.

This liquor $L_5$ is then introduced into (I) where it is saturated with HCl by the introduction of the gaseous fraction $G_1$ of recycled HCl, causing the hexahydrated aluminum chloride to precipitate.

The fraction $L_8$, leaving (I), is a pulp constituted of a suspension of hydrated aluminum chloride in a hydrochloric liquor.

This pulp $L_8$ is introduced at (J), where the phases are separated, to give crystals $S_9$ of hydrated aluminum chloride which contain a relatively large quantity of impurities owing to the presence of the impregnating liquor and which are recycled into the dissolving zone (E), and a hydrochloric liquor $L_9$ which is charged with the impurities initially present in the ore.

The hydrochloric liquor $L_9$ is treated with a recycled sulphuric liquor $L_{13}$ and, optionally, with additions of $H_2SO_4$ and HCl to compensate for the losses while carrying out the various stages of the process. The mixture of these various liquors constitutes the sulpho hydrochloric liquor $L_{10}$ which is introduced at (K) for degassing to give a practically sulphuric $L_{11}$ liquor containing impurities and gaseous HCl which is recycled into (I).

Potassium is introduced into the liquor $L_{11}$ in the form of a salt, such as a sulphate or chloride. The liquor obtained is then transferred into (M) where concentration is effected by evaporation of water and elimination of the last traces of HCl, constituting gaseous fraction $G_2$ which, after condensation, is absorbed at (P).

The fraction $L_{12}$ leaving (M) is present in the form of a pulp containing a solid phase constituted of complex sulphates of impurities precipitated during the evaporation in (M) and a liquid phase which is a sulphuric liquor.

The two phases are then separated in (N) into a cake $S_{13}$, formed of a mixture of complex sulphates of iron, titanium, etc., which can be subsequently calcined and a liquor $L_{13}$ which is recycled between the separation treatment (J) and the degassing treatment (K) to be added to the hydrochloric liquor of impurities $L_9$.

EXAMPLE

A calcined kaolin having the following composition in percent by weight was treated by the process according to the invention:

| | |
|---|---|
| $Al_2O_3$ | 42.08% |
| $Fe_2O_3$ | 1.37% |
| $TiO_2$ | 2.37% |
| $Na_2O$ | 0.08% |
| $K_2O$ | 0.15% |
| MgO | 0.23% |
| $P_2O_5$ | 0.08% |
| CaO | 1.07% |
| $SiO_2$ and various | 52.58% |

2619 kg of this ore was calcined in (A) and placed in (B) in 12407 kg of a hydrochloric liquor $L_7$ containing, in percent by weight:

|  |  |
|---|---|
| 21.19% | of total HCl |
| 1.36% | of $Al_2O_3$ |
| 0.05% | of $Fe_2O_3$ |
| 0.04% | of CaO |
| 77.34% | of water |

The attacking medium was at a temperature of 108° C. and was maintained at this level for 2 hours.

The pulp obtained after the attack was transferred into (C) were the solid phase $S_1$ and the liquid phase $L_1$, containing the dissolved alumina and a large proportion of the impurities initially present in the ore, were separated.

The cake $S_1$ was then rinsed in (D) with a quantity of water, allowing the mother water impregnating the inert materials to be extracted to give an inert residue $S_2$ and a residual liquor $L_2$ representing a mass of 4711 kg, which was added to the liquor $L_6$ to constitute the above-mentioned attacking liquor $L_7$.

The residue $S_2$ in the dry state, representing a mass of 1626 kg, had the following composition, expressed in percent by weight:

|  |  |
|---|---|
| $Al_2O_3$ | 4.74% |
| $Fe_2O_3$ | 0.31% |
| $TiO_2$ | 3.75% |
| $K_2O$ | 0.06% |
| CaO | 0.12% |
| $H_2O$ of constitution | 7.13% |
| $SiO_2$ and various | 83.89% |

The liquor obtained after the attack of the ore and separation of the inert materials represented a mass of 12607 kg and had the following composition, expressed in percent by weight:

|  |  |
|---|---|
| $Al_2O_3$ | 8.9% |
| $Fe_2O_3$ | 0.28% |
| $Na_2O$ | 0.01% |
| $K_2O$ | 0.02% |
| MgO | 0.05% |
| $P_2O_5$ | 0.01% |
| CaO | 0.23% |
| HCl | 19.62% |
| $H_2O$ | 70.84% |

This liquor $L_1$ was passed into (E) where a recycled cake $S_9$, originating from the separation treatment (J), was dissolved.

The cake $S_9$, which was essentially constituted of impure hexahydrated aluminum chloride and charged with the impregnating mother waters, represented a mass of 2439 kg and had the following composition, expressed in percent by weight:

|  |  |
|---|---|
| $Al_2O_3$ | 18.12% |
| $Fe_2O_3$ | 0.25% |
| $K_2O$ | 0.04% |
| MgO | 0.04% |
| CaO | 0.21% |
| HCl | 43.54% |
| $H_2O$ | 37.68% |

After solution treatment in (E), a liquor $L_3$ representing a mass of 15046 kg, was introduced into (F), where it was concentrated by evaporation, 6000 kg of water was removed, giving 9046 kg of a suspension $L_4$ of hexahydrated aluminum chloride in a hydrochloric solution still containing alumina and impurities. This suspension $L_4$ was transferred into (G) for the separation of a cake $S_5$ which before washing had a mass of 5433 kg and a mother liquor $L_5$ containing in solution the unprecipitated fraction of alumina and impurities such as iron, titanium, etc., representing a mass of 3616 kg.

The $S_5$ crystals were rinsed in (H) with 7763 kg of a liquor $L_{14}$ of recycled hydrochloric acid having a concentration of 32%, to give 5500 kg of impregnated crystals of $AlCl_3$, $6H_2O$ and 7696 kg of a liquor $L_6$.

After rinsing, the pure crystals of hexahydrated aluminum chloride were then thermally decomposed in (O) to give 1000 kg of pure alumina and gases formed in HCl and water vapor. The vapors were washed and adsorbed by water in (P) to constitute, with the condensed gaseous fraction $G_2$, the liquor $L_{14}$ for rinsing the hexahydrated aluminum chloride.

Mechanical losses of HCl and alumina are observed during this operation.

The above-mentioned liquor $L_6$, intended to be recycled to the attack, had the following composition, expressed in percent by weight:

|  |  |
|---|---|
| $Al_2O_3$ | 1.39% |
| $Fe_2O_3$ | 0.05% |
| MgO | 0.01% |
| CaO | 0.04% |
| HCl | 32.37% |
| $H_2O$ | 66.13% |

The mixture of the liquors $L_2$ and $L_6$ constituted the attacking liquor which represented a mass of 12407 kg and had the following composition expressed in percent by weight:

|  |  |
|---|---|
| $Al_2O_3$ | 1.36% |
| $Fe_2O_3$ | 0.05% |
| CaO | 0.04% |
| HCl | 21.19% |
| $H_2O$ | 77.34% |

As previously described, the hydrochloric mother liquor $L_5$ originating from the separation treatment (G) and containing, in solution, the unprecipitated fraction of alumina and dissolved impurities, represented a mass of 3613 kg. This liquor $L_5$ had the following composition, expressed in percent by weight:

|  |  |
|---|---|
| $Al_2O_3$ | 12.43% |
| $Fe_2O_3$ | 1.02% |
| $TiO_2$ | 0.03% |
| $Na_2O$ | 0.06% |
| $K_2O$ | 0.11% |
| MgO | 0.19% |
| $P_2O_5$ | 0.06% |
| CaO | 0.88% |
| HCl | 31.28% |
| $H_2O$ | 53.89% |

After being transferred into (I), this liquor was chlorinated by introducing 522 kg of gaseous HCl originating from the degassing treatment (K).

The chlorination product was transferred into (J) for the separation of the hydrochloric liquor $L_9$, representing a mass of 1696 kg, and impure crystals $S_9$ of hexahydrated aluminum chloride, the mass and composition of which have already been given.

The liquor $L_9$, leaving the separation treatment (J), had the following composition, expressed in percent by weight:

| | |
|---|---|
| $Al_2O_3$ | 0.41% |
| $Fe_2O_3$ | 1.83% |
| $TiO_2$ | 0.06% |
| $Na_2O$ | 0.12% |
| $K_2O$ | 0.18% |
| MgO | 0.35% |
| $P_2O_5$ | 0.12% |
| CaO | 1.53% |
| HCl | 34.79% |
| $H_2O$ | 60.61% |

To this hydrochloric liquor $L_9$ was added the sulphuric liquor $L_{13}$ originating from the separation treatment (N), which represented a mass of 8000 kg, and had the following composition, expressed in percent by weight:

| | |
|---|---|
| $Al_2O_3$ | 0.28% |
| $Fe_2O_3$ | 0.28% |
| $K_2O$ | 0.28% |
| $H_2SO_4$ free | 55.65% |
| $H_2SO_4$ total | 57.23% |
| $H_2O$ | 34.69% |

The mixture of the liquors $L_9$ and $L_{13}$, represented a mass of 10321 kg which received a further 313 kg of $H_2SO_4$ and 115 kg of HCl in a proportion of 33% to compensate for the losses occurring in the cycle. The mass thus obtained, that is to say 10749 kg, constituted the liquor $L_{10}$ having the following composition, expressed in percent by weight:

| | |
|---|---|
| $Al_2O_3$ | 0.32% |
| $Fe_2O_3$ | 0.57% |
| $TiO_2$ | 0.01% |
| $Na_2O$ | 0.02% |
| $K_2O$ | 0.44% |
| MgO | 0.06% |
| $P_2O_5$ | 0.02% |
| CaO | 0.27% |
| $H_2SO_4$ total | 54.61% |
| HCl | 1.10% |
| $H_2O$ | 42.58% |

The liquor $L_{10}$ was then introduced into (K) where degassing was performed by heating to give 522 kg of gaseous HC1, passed toward (I) along $G_1$, and 10227 kg of a sulphuric liquor still containing impurities, to which was added a mass of 15 kg of $K_2O$ in the form of a sulphate, thus forming the liquor $L_{11}$.

The said liquor $L_{11}$ was transferred into (M) where it was concentrated by separation, 1088 kg of water and the last traces of HCl were eliminated, water vapor and gaseous HCl being directed toward (P), where HCl was absorbed.

The fraction $L_{12}$, leaving (M), represented a mass of 8542 kg, formed of a solid phase suspended in the liquid phase. Once introduced into (N), this fraction $L_{12}$ yielded 542 kg of a cake $S_{13}$ and 8000 kg of a sulphuric liquor $L_{13}$.

The cake $S_{13}$ was formed of double sulphates of impurities to be eliminated by precipitation during the evaporation operation in (M) and had the following composition, expressed in percent by weight:

| | |
|---|---|
| $Al_2O_3$ | 1.29% |
| $Fe_2O_3$ | 5.72% |
| $TiO_2$ | 0.18% |
| $Na_2O$ | 0.37% |
| $K_2O$ | 3.32% |
| MgO | 1.11% |
| $P_2O_5$ | 0.38% |
| CaO | 4.80% |
| $H_2SO_4$ free | 30.07% |
| $H_2SO_4$ | 59.59% |
| $H_2O$ | 23.25% |

The sulphuric liquor $L_{13}$ was recycled down stream of the separation treatment (J) to be added to the liquor $L_9$.

The alumina obtained was extremely pure and analysis of it demonstrated that the few impurities present were present in quantities expressed in ppm which were smaller than those generally measured in the aluminas obtained by commercial industrial processes:

Fe < 200 ppm
Si < 40 ppm
Ti < 8 ppm
K < 90 ppm
Na < 20 ppm
Ca < 200 ppm
Mg < 100 ppm
P < 10 ppm

We claim:

1. A process for obtaining pure alumina from calcined or uncalcined ore containing impurities of metals selected from the group consisting of iron, titanium, sodium, potassium, magnesium, and calcium comprising:
   (a) attacking the ore with hot hydrochloric acid to provide a residue and a liquor containing dissolved aluminum chloride and impurities,
   (b) separating the attacking liquor from the residue,
   (c) washing the separated residue with aqueous medium to extract water solubles,
   (d) recycling the wash liquor from step (c) to constitute a part of the liquor used to attack the ore in step (a),
   (e) concentrating the liquor separated from the residue in step (b) until at most 75% of the alumina is precipitated as aluminum chloride hexahydrate,
   (f) separating the precipitated aluminum chloride hexahydrate from the remaining liquor containing in solution dissolved aluminum chloride and impurities;
   (g) introducing gaseous HCl into the liquor separated from the precipitated aluminum chloride hexahydrate in step (f) to precipitate residual aluminum chloride hexahydrate from the solution,
   (h) separating the aluminum chloride hexahydrate precipitate in step (g) from the hydrochloric liquor which still contains dissolved impurities,
   (i) recycling the aluminum chloride hexahydrate separated in step (h) to the liquor separated from the residue in step (b),
   (j) mixing the hydrochloric acid liquor from step (h) with sulphuric acid liquor and HCl,
   (k) heating the mixture of step (j) to concentrate the mixture and release HCl,
   (l) absorbing the HCl released from the mixture in step (k)

(m) washing the aluminum chloride hexahydrate separated from the liquor in step (f) with the HCl liquor from the absorption step (l)

(n) separating the wash liquor from the aluminum chloride hexahydrate washed in step (m), (o) recycling the wash liquor from step (n) to make up a part of the hydrochloric acid liquor for attacking the ore in step (a) and (p) thermally decomposing the separated aluminum chloride hexahydrate from step (n) to produce pure alumina.

2. A process for obtaining a very pure alumina as claimed in claim 1, characterized in that the ore is attacked at elevated temperature.

3. A process as claimed in claim 2 in which the temperature of attack is close to the boiling point of the attacking liquor.

4. The process as claimed in claim 1 which includes the step of:

(q) adding potassium values to the liquor separated from the aluminum chloride hexahydrate crystals in step (h) before heating to concentrate the mixture to release HCl and precipitate impurities;

(r) separating the sulphuric acid liquor from the impurities precipitated in step (q); and (s) recycling the sulphuric acid liquor from step (r) to provide sulphuric acid liquor mixed with the hydrochloric acid liquor in step (j).

5. A process for obtaining a very pure alumina as claimed in claim 4 in which the impurities separated in step (r) include ferripotassium sulphates and sulphates of impurities, calcining the separated precipitate in order to make use of released $SO_2$ by converting it into $H_2SO_4$, recycling the $H_2SO_4$ to provide sulphuric acid liquor mixed with the hydrochloric acid liquor in step (j), and reintroducing it into the circuit of the process.

* * * * *